United States Patent [19]
Morash

[11] Patent Number: 4,825,819
[45] Date of Patent: May 2, 1989

[54] HYPERGOLIC/CATALYTIC ACTUATOR

[75] Inventor: Douglas H. Morash, Elma, N.Y.

[73] Assignee: Moog Inc., East Aurora, N.Y.

[21] Appl. No.: 893,658

[22] Filed: Aug. 6, 1986

[51] Int. Cl.[4] .............................................. F02B 71/00
[52] U.S. Cl. .............................. 123/46 R; 137/624.14; 60/258; 60/741
[58] Field of Search .............. 60/258, 741; 123/188 B, 123/90.24, 46 H, 46 R, 46 SC, 46 A; 137/624.13, 624.14; 239/410, 411; 417/364, 380

[56] References Cited

U.S. PATENT DOCUMENTS

| | | | |
|---|---|---|---|
| 979,164 | 12/1910 | Hillhouse . | |
| 2,604,851 | 7/1952 | Archibald . | |
| 2,775,484 | 12/1956 | Fox | 60/741 |
| 3,044,401 | 7/1962 | Sawyer . | |
| 3,044,452 | 7/1962 | McCrory et al. | 123/46 SC |
| 3,215,352 | 11/1965 | Meraz, Jr. | 60/258 |
| 3,320,740 | 5/1967 | Hamkins | 123/46 R |
| 3,328,965 | 7/1967 | Taylor et al. | 60/258 |
| 3,897,008 | 7/1975 | Dettling et al. | 60/258 |
| 4,295,453 | 10/1981 | Seilly et al. | 417/417 |
| 4,333,424 | 6/1982 | McFee | 123/46 R |
| 4,413,953 | 11/1983 | Fales | 417/417 |
| 4,500,265 | 2/1985 | Evans et al. | 417/417 |
| 4,518,317 | 5/1985 | Inoue | 417/419 |
| 4,530,317 | 7/1985 | Schutten | 123/46 R |
| 4,541,787 | 9/1985 | DeLong | 417/417 |
| 4,671,745 | 6/1987 | Smith | 417/419 |

FOREIGN PATENT DOCUMENTS

| | | | |
|---|---|---|---|
| 75883 | 4/1983 | European Pat. Off. | 123/46 R |
| 1289363 | 2/1969 | Fed. Rep. of Germany | 60/258 |
| 146132 | 7/1962 | U.S.S.R. | 239/411 |

Primary Examiner—Donald E. Stout
Attorney, Agent, or Firm—Sommer & Sommer

[57] ABSTRACT

A fluid-powered actuator has a piston slidably mounted in a cylinder. The piston subdivides the cylinder into first and second end chambers. A plurality of solenoid valves are arranged to selectively inject fuel and oxidizer into either chamber, or to inject liquid oxidizer to react with a solid fuel. Upon contact with one another, the fuel and oxidizer undergo a hypergolic reaction, and the products of this reaction create a pressure sufficient to displace the piston. Alternatively, a mono-propellant fluid fuel may be injected into such chamber. Upon contact with a catalyst in the chamber, the fuel undergoes a disassociation reaction, and the products thereof may be used to displace the piston.

19 Claims, 4 Drawing Sheets

HYPERGOLIC/CATALYTIC ACTUATOR

BACKGROUND OF THE INVENTION

1. Field of the Invention

This invention relates generally to the field of actuators for selectively moving one member relative to another, and, more particularly, to an improved actuator which uses either the products of a hypergolic reaction between a suitable solid or liquid fuel and an oxidizer, or the products of a disassociation reaction between a suitable mono-propellant fuel and a catalyst, to selectively move a valve member relative to its seat.

2. Description of the Prior Art

Actuators abound in many different forms, and are used for many different purposes. Such actuators may be fluid-powered (as in the case of a piston-and-cylinder), or electro-mechanical (as in the case of a solenoid, a force motor, or a torque motor). It is, of course, well known to use such actuators to move a valve element relative to an associated seat.

However, in the field of rocketry and spacecraft, weight is a primary consideration. While actuators may be miniaturized in an attempt to reduce their weight and size, such actuators must also have the capability of creating a force sufficient to displace an applied load. In general, the greater the applied load, the larger and heavier the actuator and any associated valve. Such vehicles typically have a plurality of rocket engines, which are used to either propel the vehicle or to control its attitude during flight (e.g., thrusters).

It is well known to supply a suitable fuel and oxidizer to a hypergolic rocket engine. When such fuel and oxidizer are mixed together, they undergo a hypergolic reaction, and the products thereof create thrust. It is also known to supply a suitable mono-propellant fuel to a rocket engine, which incorporates a suitable triggering catalyst. Upon contact with the catalyst, the fuel undergoes a disassociation reaction, and the products thereof are also used to create thrust. In controlling the operation of these engines, it is necessary to control the flow of the serviced fluid(s) supplied thereto.

SUMMARY OF THE INVENTION

The present invention provides an improved actuator which may be used to control the movement of one member (e.g., a valve member) relative to another member (e.g., a valve seat).

In one form, the actuator is adapted to be associated with sources of a suitable oxidizer and fuel (preferably in fluid form), the oxidizer and fuel undergoing a hypergolic reaction upon contact with one another. In this form, the improved actuator broadly includes: a cavity having a first surface; a member mounted in this cavity for movement toward and away from the first surface, and forming a first chamber between the member and the first surface; a first valve communicating with the source of fuel, and operatively arranged to selectively admit fuel to the first chamber; a second valve communicating with the source of oxidizer, and operatively arranged to selectively admit oxidizer to the first chamber; whereby, when the first and second valves are opened simultaneously, the products of the resulting hypergolic reaction in the first chamber will cause the member to move away from the first surface.

In another form, the improved actuator is adapted to be associated with a source of mono-propellant fluid fuel. In this form, the improved actuator comprises: a cavity having a first surface; a member mounted in this cylinder for movement toward and away from the first surface and forming a first chamber between the member and the first surface; a first catalyst arranged in the first chamber, this being capable of reacting with the fuel admitted to the first chamber for causing the fuel to disassociate; and a first valve communicating with the propellant source and operatively arranged to selectively admit fuel to the first chamber; whereby, when the first valve is opened, fuel will enter the first chamber and will react with the catalyst, and the products of the resulting disassociation reaction will move the piston away from the first surface.

Accordingly, the general object of the invention is to provide an improved actuator.

Another object is to provide an improved actuator which uses the products of a hypergolic reaction between a suitable solid or fluid fuel and a suitable oxidizer to move one member relative to another.

Another object is to provide an improved actuator which uses the products of a disassociation reaction between a suitable mono-propellant fuel and a catalyst, to move one member relative to another.

Still another object is to provide an improved propellant-actuated valve for controlling the flow(s) of fuel and/or oxidizer to a rocket engine.

These and other objects and advantages will become apparent from the foregoing and ongoing written specification, the drawings, and the appended claims.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. §112. As used in the following description, the terms "horizontal", "vertical", "left", "right", "up" and "down", as well as adjectival and adverbial derivatives thereof (e.g., "horizontally", "rightwardly", "upwardly", etc.), refer to the orientation of the illustrated structure as the particular drawing figure faces the reader. Similarly, the terms "inwardly" and "outwardly" refer to the orientation of a surface of revolution relative to its axis. As used herein, the term "fluid" encompasses both a liquid and a gas.

Referring now to the drawings, this invention broadly provides an improved actuator, of which several embodiments are disclosed. The actuator may use the products of a hypergolic reaction, which results when a suitable fuel and oxidizer are mixed together, to move one member relative to another. Alternatively, the actuator may use the products of a disassociation reaction between a mono-propellant fluid fuel and a catalyst, to selectively move one member relative to another. The improved actuator may, for example, be used to selectively displace a valve member toward and away from a seat. However, it should be clearly understood that this particular application is merely illustrative, and that the improved actuator may be used for many diverse and varied purposes.

Several embodiments of the improved actuator, and the hypergolic and catalystic forms of each, will be described seriatim herebelow.

Figure 1A:
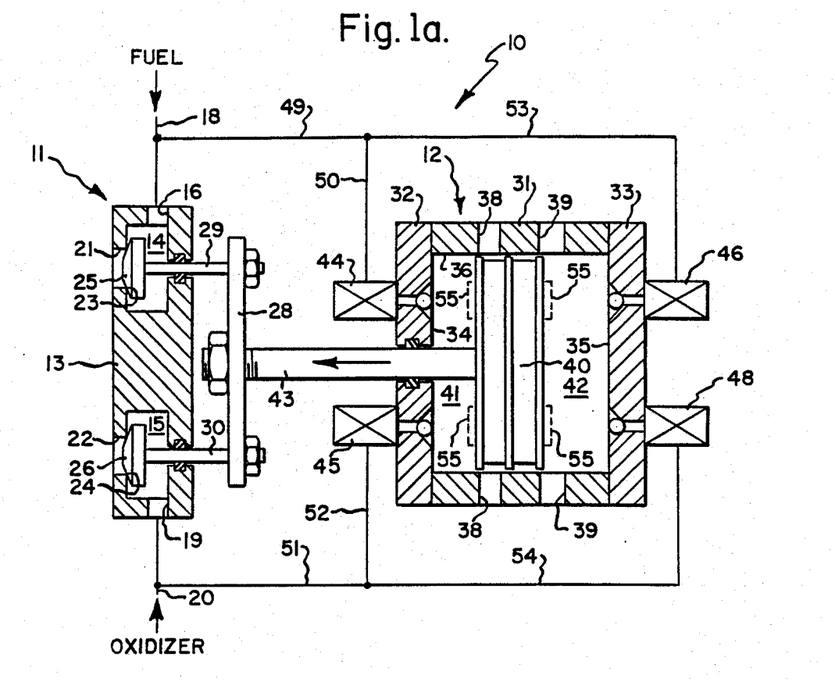
FIG. 1a is a schematic vertical sectional view of a first form of the improved actuator and an associated control valve, this view showing the valve as being closed.
Figure 1B:
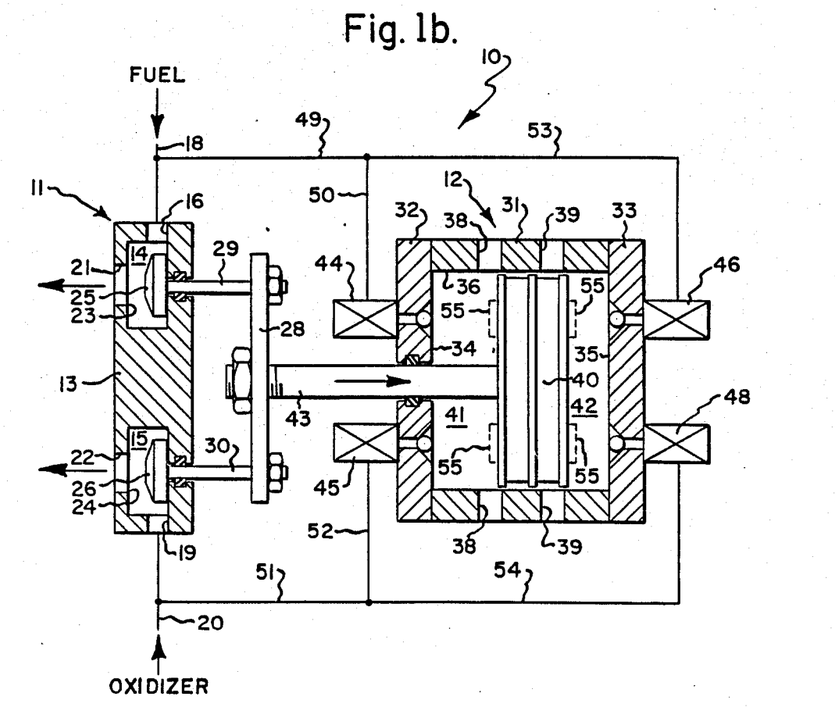
FIG. 1b is a schematic view similar to FIG. 1a, but showing the actuator as having been operated so as to open the valve to permit simultaneous flows of fuel and oxidizer to a hypergolic rocket engine.

First Embodiment (FIGS. 1a–1b)

Referring now to FIGS. 1a and 1b, an improved valve assembly, generally indicated at 10, is schematically shown as including a leftward valve portion 11 and a rightward actuator portion 12.

The valve portion 11 is shown as having a vertically-elongated rectangular body 13 provided with internal upper and lower rectangular chambers 14,15, respectively. A vertical hole 16 communicates upper chamber 14 with a source (not shown) of pressurized fluid fuel via a conduit 18. Another vertical hole 19 communicates lower chamber 15 with a source (not shown) of pressurized fluid oxidizer via a conduit 20. Horizontal holes 21,22 communicate chambers 14,15, respectively, with a suitable device (not shown), such as a hypergolic rocket engine, via appropriate conduits (not shown). A rightwardly-facing circular vertical seat 23 is formed where outlet hole 21 opens into upper recess 14. Similarly, another rightwardly-facing circular vertical seat 24 is formed where outlet hole 22 opens into lower recess 15.

A valve member is mounted in each body chamber for horizontal movement toward and away from the associated seat. Thus, the upper member 25 is mounted for movement relative to seat 23, while the lower member 26 is mounted for movement relative to seat 24. Each of these members has a leftwardly- and outwardly-facing frusto-conical surface arranged to selectively engage the associated seat to prevent flow from the chamber inlet to the chamber outlet, as shown in FIG. 1a. However, both members may be moved rightwardly relative to the body, to the position shown in FIG. 1b, to permit flow from the associated chamber inlet to the associated chamber outlet.

Members 25,26 are connected to a common vertical bar 28 for simultaneous horizontal movement toward or away from their associated seats. To this end, upper and lower rods 29,30 have their rightward marginal end portions suitably secured to bar 28, have their intermediate portions sealingly and slidably penetrating appropriate body holes, and have their leftward marginal end portions secured to the upper and lower members 25,26, respectively. Annular grooves are shown as extending radially into the body from these body holes to accommodate suitable O-rings or the like, which seal the rod penetrant portions to the body while permitting relative sliding movement therebetween. The fuel and oxidizer undergo a hypergolic reaction when mixed together. Examples of such fuel include 50/50 unsymmetrical dimethylhydrazine, hydrazine, and mono-methylhydrazine, while the oxidizer may be nitrogen tetroxide, fuming nitric acid, or the like. Other fuels and oxidizers may be used.

The actuator portion comprises a cylinder which includes a horizontally-elongated cylindrical tube 31. The left and right ends of this tube are closed by disk-like left and right end caps 32,33, respectively. Each of these end caps is sealingly secured to the intermediate tube portion 31 by suitable means (not shown). Thus, the end cap-tube-end cap subassembly forms an internal chamber defined by left and right substantially-circular vertical end surfaces 34,35, and an inwardly-facing horizontal cylindrical surface 36. The cylindrical tube is provided with a plurality of radial first vent openings, severally indicated at 38, and a plurality of radial second vent openings, severally indicated at 39. The several first vent openings are arranged in a ring and spaced equally about the cylindrical tube, and are spaced axially from the similar ring of second vent openings.

A piston 40 is mounted within the cylinder for horizontal sliding movement therealong toward and away from end surfaces 34,35. Piston 40 therefore subdivides the cylinder into a leftward first chamber 41 between the piston and the left end surface 34, and a rightward second chamber 42 between the piston and the right end surface 35. A horizontal rod 43 has its left marginal end portion suitably secured to bar 28, has an intermediate portion sealingly penetrating an axial hole provided through left end cap 32, and has its right marginal end portion secured to piston 40. Thus, piston 40 and valve members 25,26 are constrained to move horizontally together between the extreme leftward position shown in FIG. 1a, at which members 25,26 engage seats 23,24, respectively, and the extreme rightward position shown in FIG. 1b, at which these members engage the leftwardly-facing vertical surfaces of chambers 14,15.

Four electrically-operated valves 44,45,46,48 are mounted on the actuator portion. If desired, these may be miniature on-off solenoid valves. The first valve 44 is mounted on the left end cap, and receives fuel from conduit 18 via series-connected conduits 49,50. The second valve 45 is also mounted on the left end cap, and receives oxidizer from conduit 20 via series-connected conduits 51,52. Conversely, third valve 46 is mounted on the right end cap and receives fuel from conduit 18 via series-connected conduits 49,53. The fourth valve 48 is also mounted on the right end cap, but receives oxidizer from conduit 20 via series-connected conduits 51,54. Each of these valves is normally-closed.

The first and second valves 44,45 may be simultaneously opened, as one cooperative pair, to spray minute quantities of fuel and oxidizer into first chamber 41. When this occurs, the fuel and oxidizer undergo a hypergolic reaction upon contact with one another, and the products of such reaction create a pressure in chamber 41 which drives the piston rightwardly. Initially, such reaction products are confined to the expanding first chamber. However, as shown in FIG. 1b, when the rightwardly-moving piston passes by, and uncovers, first vent openings 38, such reaction products will thereafter be vented from the first chamber.

When the piston is in its rightward position, as shown in FIG. 1b, third and fourth valves 46,48 may be simultaneously opened, as another cooperative pair, to spray minute quantities of fuel and oxidizer into the second chamber. Here again, the fuel and oxidizer undergo a hypergolic reaction upon contact with one another in the second chamber, and thr products of such reaction create a pressure in chamber 42 which drives the piston leftwardly. When the piston is in the position shown in FIG. 1b, the piston covers second vent openings 39, thereby initially confining the products of such reaction to the second chamber. However, as the piston moves leftwardly, the second vent openings 39 will be uncovered, thereby allowing such reaction products to be vented from the second chamber.

Persons skilled in this art will appreciate that the first and second valves 44,45, and the third and fourth valves, 46,48, need only be opened momentarily to admit minute quantities of fuel and oxidizer to the appropriate chamber. These two cooperative pairs of valves may therefore be operated alternatively to selectively displace the piston either leftwardly or rightwardly relative to the cylinder, as desired. Moreover, when the improved actuator is used to control the operation of a valve portion, which in turn controls the flow of fuel and oxidizer to, say, a hypergolic rocket engine (not shown), only minute quantities of such serviced fluids need be tapped-off and used to operate the improved actuator. The fluid(s) controlled by the valve portion may, of course, be other than the bi-propellant fuel and oxidizer.

Persons skilled in this art will readily appreciate that while the foregoing embodiment uses the products of a hypergolic reaction between a fuel and oxidizer to selectively displace the piston relative to the cylinder, a similar result might also be obtained by using the products of a disassociation reaction between a suitabel mono-propellant fuel and a catalyst. To do this, an appropriate catalyst bed (or solid fuel), such as shown in phantom and indicated at 55, would be placed in each of chambers 41,42. Oxidizer valves 45,48 would then be unnecessary, and could be eliminated. One or more valves, such as valves 44,46, could be selectively operated to admit minute quantities of a suitable mono-propellant fuel to the appropriate chamber. Upon contact with the catalyst bed, the fuel would disassociate, and the products of this reaction would be used to drive the piston either leftwardly or rightwardly relative to the cylinder, as desired.

Figure 2A:
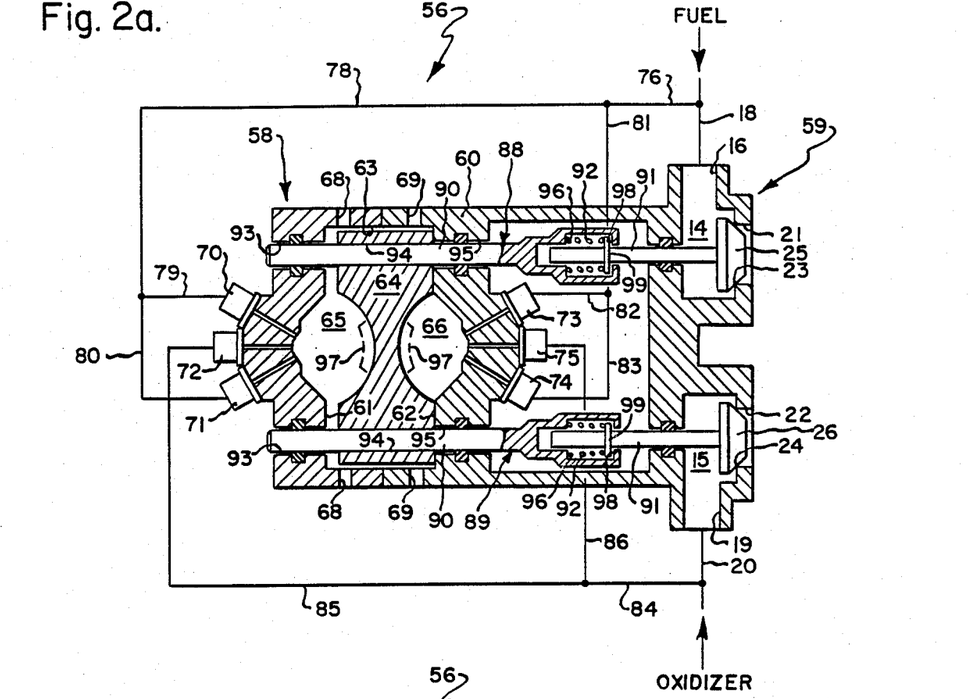
FIG. 2a is a schematic vertical sectional view of a second form of the improved actuator and an associated valve, this view showing the valve as being closed.
Figure 2B:
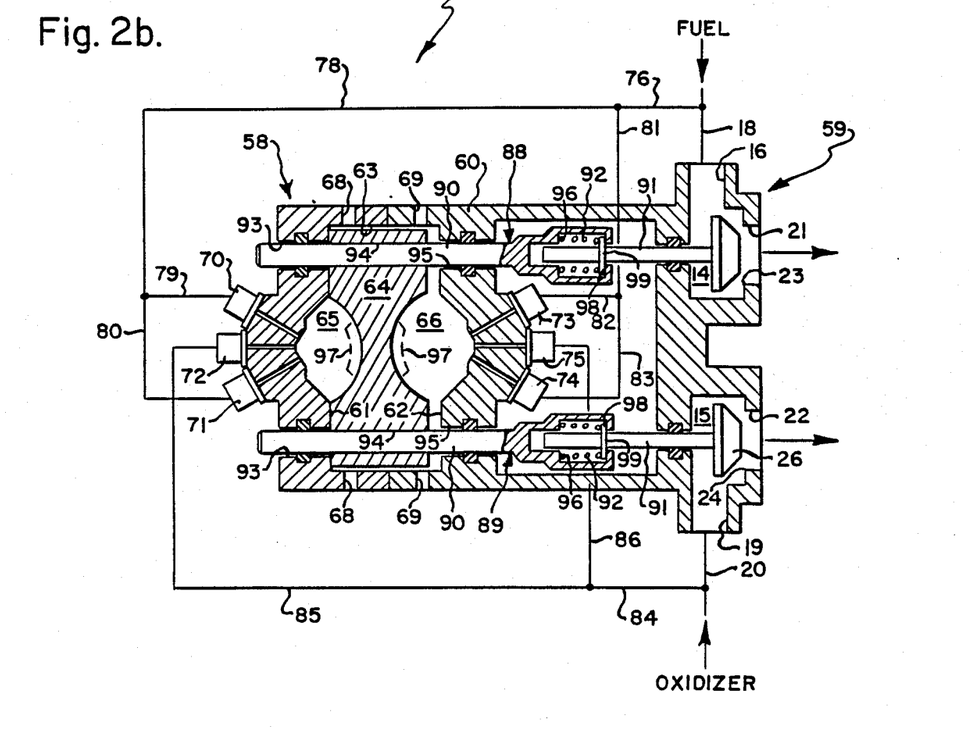
FIG. 2b is a schematic view similar to FIG. 2a, but showing the actuator as having been operated so as to open the valve to permit simultaneous flows of fuel and oxidizer to a hypergolic rocket engine.

Second Embodiment (FIGS. 2a and 2b)

A second embodiment of the improved actuator, generally indicated at 56 in FIGS. 2a–2b, is schematically shown as including a leftward actuator portion 58, and a rightward valve portion 59, both mounted within a common body 60.

The body has a leftward cavity bounded by a rightwardly-facing annular vertical surface 61, a leftwardly-facing annular vertical surface 62, and an inwardly-facing horizontal cylindrical surface 63. A piston 64 is mounted within this body cavity for horizontal sliding movement therealong. Hemispherical recesses extend into the piston from its left and right faces, and these recesses are arranged to face other cooperative recesses provided in the body. Thus, the piston subdivides this body cavity into a leftward or first chamber 65, and a rightward or second chamber 66. When the piston is in the extreme rightward position shown in FIG. 2a, at which the right face of the piston abuts cavity surface 62, the piston will uncover a ring of circumferentially-spaced radial first vent openings, severally indicated at 68, but will cover another similar ring of circumferentially-spaced radial second vent openings, severally indicated at 69, spaced axially from the first ring. Conversely, when the piston is in the extreme leftward positon shown in FIG. 2b, at which the left face of the piston abuts cavity surface 61, the piston will cover the first vent openings and uncover the second vent openings.

This embodiment is shown as having six electrically-operated valves 70, 71,72,73,74,75 mounted on the body. The first and second valves 70,71 receive the pressurized fluid from a suitable source (not shown), and may be selectively operated to admit fuel to first chamber 65. The third valve 72 receives pressurized oxidizer from a suitable source (not shown), and may be selectively operated to admit oxidizer to the first chamber. When it is desired to move the piston rightwardly, valves 70,71, 72 are momentarily opened to admit minute quantities of fuel and oxidizer to chamber 65. The resulting hypergolic reaction between the fuel and oxidizer creates a pressure sufficient to drive the piston rightwardly. When such displacement of the piston uncovers vents 68, the products of this reaction are thereafter permitted to exhaust from the first chamber. Conversely, the fourth and fifth valves 73,74 receive pressurized fuel from a suitable source (not shown), and may be selectively operated to admit fuel to second chamber 66. The sixth valve 75 receives pressurized oxidizer from a suitable source (not shown), and may be selectively operated to admit oxidizer to second chamber 66. Thus, when it is desired to move the piston leftwardly, valves 73,74,75 are momentarily opened to admit minute quantities of fuel and oxidizer to chamber 66. Such mixture of the fuel and oxidizer will cause a hypergolic reaction in second chamber 66, and the products of this reaction will create a pressure sufficient to drive the piston leftwardly against body surface 61. When vent 69 has been uncovered, the reaction products will be allowed to exhaust from the second chamber.

The rightward valve portion 59 is, in substance, a mirror image of the valve portion 11 of the first embodiment. Hence, the same reference numerals have been used to identify the corresponding elements and surfaces of this portion of the second embodiment, and a specific description thereof will be omitted. If desired, pressurized fuel may be supplied from conduit 18 to valves 70,71 via series-connected conduits 76,78,79 and series-connected conduits 76,78,80, respectively; and supplied to valves 73,74 via series-connected conduits 76,81,82 and series-connected conduits 76,81,83, respectively. Similarly, pressurized oxidizer may be supplied from conduit 20 to valve 72 via series-connected conduits 84,85, and to valve 75 via series-connected conduits 84,86.

In this second embodiment, the piston is coupled to valve members 25,26 by horizontally-elongated upper and lower rod assemblies 88,89, respectively. Each rod assembly has a leftward rod 90, a rightward rod 91, and a spring 92 acting therebetween.

Each of left rods 90 has its left marginal end portion sealingly and slidably mounted in a leftward horizontal hole 93 provided in the body, has an intermediate portion penetrating an aligned horizontal hole 94 provided in the piston has a nextrightward portion sealingly and slidably mounted in another aligned horizontal hole 95 provided in the body, and has a radially-enlarged head adjacent its right end. This head accommodates a stepped recess, which extends leftwardly from its right end face, and telescopingly receives the left marginal end portion of right rod 91. This recess is shown as including left and right annular vertical abutment surface 96,98, respectively. Left rods 90 are suitably fixed to the piston for movement therewith.

As previously noted, the left marginal end portions of right rods 91 are received in the associated left rod recesses. A washer-like member 99 is fixed to an intermediate portion of each right rod, and is arranged within the left rod recess. Each spring 92 is arranged to act between left rod abutment surface 96 and right rod abutment member 99. These coil springs are compressed and continuously urge right rods 91 to move rightwardly until abutment members 99 engage recess abutment surfaces 98, as shown in FIG. 1b. However, when the actuator portion is operated so as to displace the piston rightwardly relative to the body, the valve members 25,26 will engage their associated seats before piston 64 reaches the end of its stroke. Hence, springs 92 act as cushions to accommodate further rightward movement of the actuator piston after valve members 25,26 have seated. On the other hand, when it is desired to open the valve portion, abutment surfaces 98 will engage abutment washers 99, and thereafter cause the valve members to move leftwardly with the piston.

As with the first embodiment, this second embodiment may be readily modified so as to use the products of a disassociation reaction between a suitable monopropellant fuel and a catalyst, rather than the products of the hypergolic reaction previously described. To effect this, a suitable catalyst bed, such as shown in phantom and indicated at 97, may be placed in each of chambers 65,66. Oxidizer valves 72,75 would be unnecessary, and the suitable fuel could be admitted via one or both of valves 70,71 and/or 73,74. Hence, upon operation of such valve(s), fuel admitted to the appropriate chamber would, upon contact with the catalyst, undergo a disassociation reaction, and the products thereof used to displace the piston. It should also be understood that the number and arrangement of the sensed solenoid valves is only illustrative, and may be readily changed or modified.

Figure 3A:
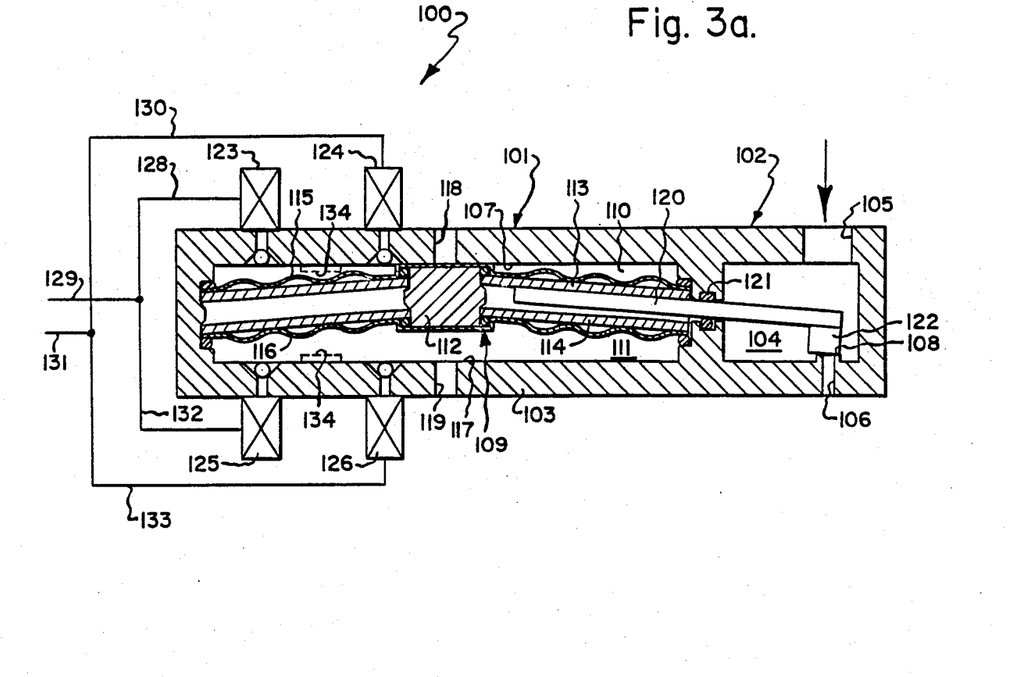
FIG. 3a is a schematic vertical sectional view of a third form of the improved actuator and an associated valve, this view showing the valve as being closed.
Figure 3B:
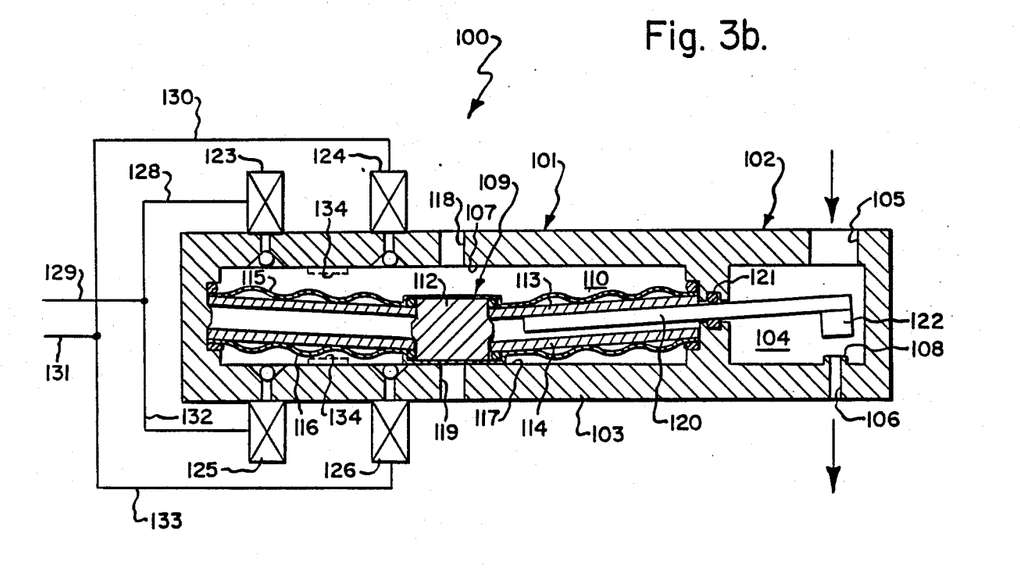
FIG. 3b is a schematic view similar to FIG. 3a, but showing the actuator as having been operated so as to open the valve.

Third Embodiment (FIGS. 3a–3b)

A third embodiment of the improved actuator, generally indicated at 100 in FIGS. 3a–3b, is shown as schematically including a leftward actuator portion 101 and a rightward valve portion 102, both of which are provided within a horizontally-elongated common rectangular body 103.

This body is shown as having a leftward relatively-large cylindrical cavity, which communicates through a narrow intermediate radial throat with a rightward relatively-small cylindrical valve cavity 104. Both of these cylindrical cavities are generated about vertical axes. Upper and lower vertical holes 105,106 are provided in the body and communicate with valve cavity 104 to provide inlet and utlet passageways, respectively. Inlet 105 communicates with a suitable source (not shown) of a serviced fluid, while outlet 106 communicates with a suitable device (not shown) consumptive of such fluid. A portion of the body about the upper end of outlet 106 is configured as a cylindrical collar, and terminates in an upwardly-facing annular horizontal seat 108.

A diaphragm-like member, generally indicated at 109, is operatively arranged in the leftward large body cavity, and sealingly subdivides the same into an upper or first chamber 110 and a lower or second chamber 111. member 109 has a horizontal central disk-like solid element 112, and two vertically-spaced annular snap rings 113,114 positioned thereabout. The inner margins of these rings flexibly engage the cylindrical side surface of central element 112, while the outer margins of these rings are received in inwardly-facing annular recesses provided in the body. Upper and lower flexible membranes 115,116 are mounted on the upper and lower surfaces of member 109, and sealingly separate chambers 110,111. The snap rings 113,114, which somewhat resemble Belleville springs, impart a toggle-like snap action to central element 112. When snapped upwardly, as shown in FIG. 3a, member 109 moves toward surface 107 such that disk element 112 will close an upper or first vertical axial vent opening 118, which normally communicates with upper chamber 110. Conversely, when snapped downwardly, as shown in FIG. 3b, member 109 moves toward surface 117 such that element 112 will close a lower or second vertical axial vent opening 119, which normally communicates with lower chamber 111. Thus, member 109 may be snapped from the position shown in FIG. 3a to the position shown in FIG. 3b, or vice versa, but is unstable in any other intermediate position. When member 109 is in the position shown in FIG. 3a, upper vent opening 118 will be closed, but lower vent opening 119 will be opened. Conversely, when member 109 is in the position shown in FIG. 3b, lower vent opening 119 will be closed, but upper vent opening 118 will be opened.

A rod 120 has its leftward marginal end portion suitably secured to the underside of upper snap ring 113, has an intermediate portion penetrating an O-ring 121, which acts as a fulcrum, arranged in the narrow throad communicating the two cavities, and has its right marginal end portion arranged in valve cavity 104. Thus, the rod is mounted for pivotal movement about O-ring 121 in response to movement of upper ring 113. A resilient member 122 is mounted on the underside of the rod adjacent its rightward end, for pivotal movement toward and away from seat 108. When member 109 is snapped upwardly to the position shown in FIG. 3a, cushion 122 will be moved downwardly and will sealingly engage seat 108, thereby blocking flow from the inlet to the outlet. However, when member 109 is snapped downwardly to the position shown in FIG. 3b, cushion 122 will be moved upwardly off seat 108, thereby permitting flow from the inlet to the outlet.

Four electrically-operated valves 123,124,125,126 are mounted on the body. The first valve 123 communicates with a pressurized source (not shown) of fuel via series-connected conduits 128,129. The second valve 124 communicates with a pressurized source (not shown) of oxidizer via series-connected conduits 130,131. The third valve 125 communicates with the fuel source via series-connected conduits 129, 132. The fourth valve 126 communicates with the oxidizer source via series-connected conduits 131,133. All four valves may be simple normally-closed solenoid-type devices, which may be selectively opened by application of a suitable electrical signal.

When the member is in its upward position, as shown in FIG. 3a, valves 123,124 may be simultaneously opened to admit minute quantities of fuel and oxidizer to upper chamber 110, while disk 112 closes vent 118. When mixed together, the fuel and oxidizer undergo a hypergolic reaction, and the products of this reaction are initially confined to the upper chamber. This reaction creates a pressure which quickly moves element 112 downwardly, thereby snapping member 109 to the alternative stable position shown in FIG. 3b. Thus, whereas the reaction products were initially confined to the first chamber, such downward movement of element 112 opens upper vent 118, thereby permitting the first chamber to exhaust.

When the member is in the position shown in FIG. 3b, lower vent 119 is closed. Valves 125,126 may then be selectively opened to admit fuel and oxidizer to lower chamber 111. When this occurs, the resulting hypergolic reaction in chamber 111 quickly snaps member 109 upwardly to the stable position shown in FIG. 3a, and thereafter permits the reaction products to exhaust from the second chamber through now-opened vent 119.

In this manner, the various valves may be operated in cooperative pairs to selectively move member 109 upwardly and downwardly between the stable hardover positions, shown in FIGS. 3a and 3b. Such movement of member 109 will produce corresponding movement of cushion 122, thereby selectively opening and closing the valve.

The valve assembly shown in FIGS. 3a and 3b may be readily modified to use the products of a disassociation reaction between a mono-propellant fluid fuel and a catalyst, if so desired. To do this, a suitable catalyst bed, such as shown in phantom and indicated at 134, would be positioned in the upper and lower chambers. A suitable mono-propellant fluid fuel could then be selectively admitted to either chamber. Upon contact with the catalyst in such chamber, the injected fuel would undergo a disassociation reaction, and the products thereof would create a pressure sufficient to displace member 109 to its other position.

Moreover, the invention may be structurally simplified by providing a single fuel inlet valve and a single fuel outlet valve, with an appropriate diverter valve between the member and enclosure for selectively diverting the reaction products into the chamber-to-be-expanded.

Figure 4A:
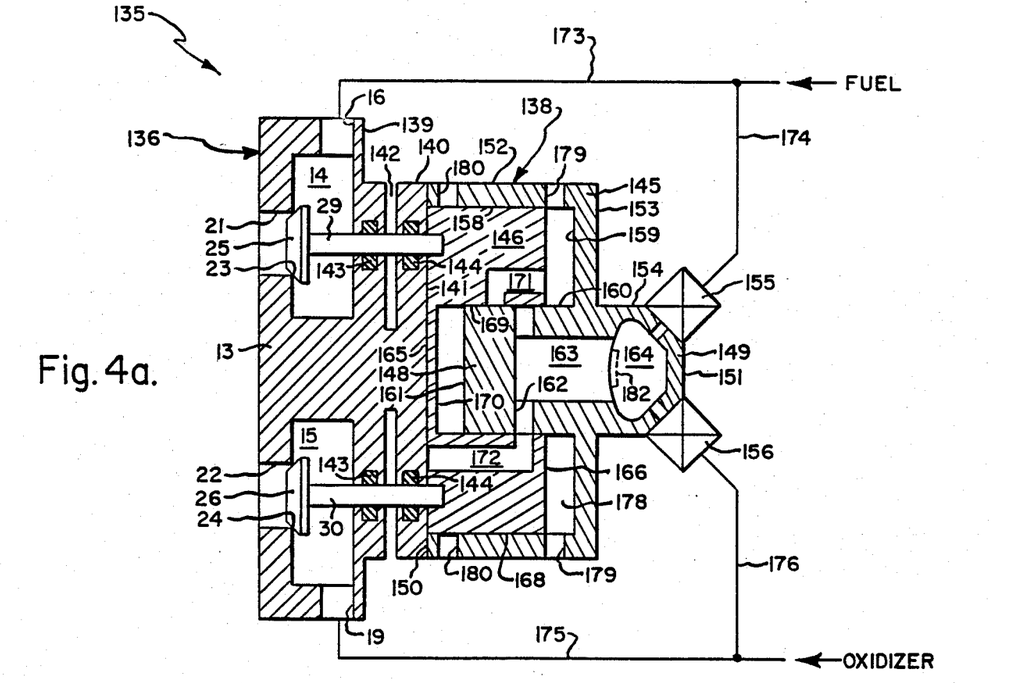
FIG. 4a is a schematic vertical sectional view of a fourth form of the improved actuator and an associated valve, this view showing the valve as being closed.
Figure 4B:
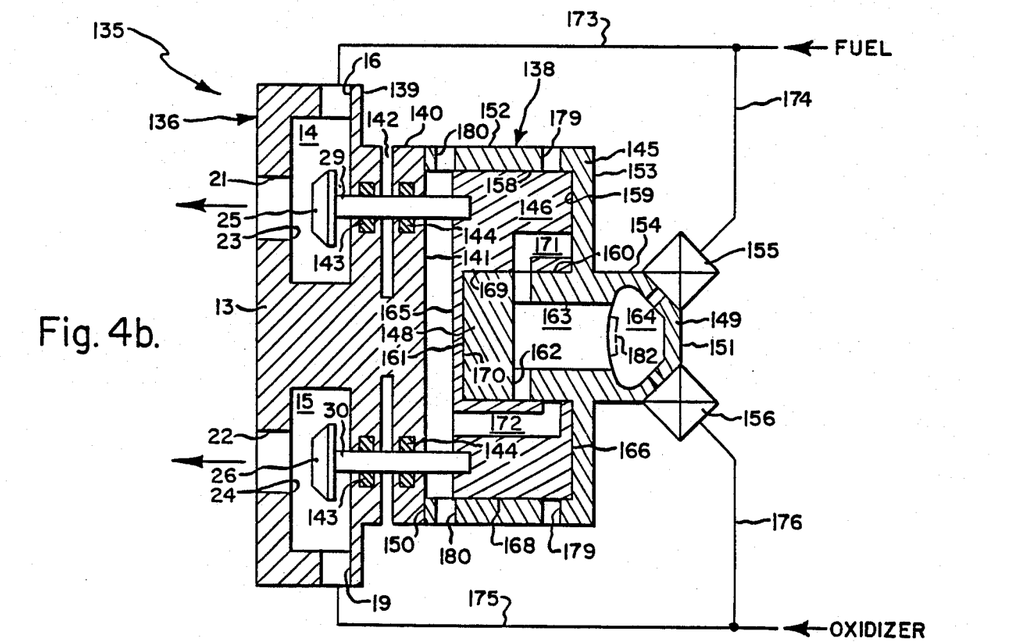
FIG. 4b is a schematic view similar to FIG. 4a, but showing the actuator as having been operated so as to open the valve.

Fourth Embodiment (FIGS. 4a–4b)

A fourth embodiment of the improved actuator, generlaly indicated at 135 in FIGS. 4a and 4b, is schematically shown as including a leftward valve portion 136 and a rightward actuator portion 138.

Valve portion 136 is substantially the same as the valve portion 11 of the first embodiment shown in FIGS. 1a and 1b. Hence, the same reference numerals have been again used in FIGS. 4a and 4b to identify like structure previously described, with the following additional description being directed to those few features by which valve portion 136 differs. Specifically, in this fourth embodiment, the rightward marginal end portion of valve portion body 13 is shown as further including a rightwardlyfacing annular vertical surface 139 extending radially inwardly from the upper and lower planar surfaces thereof, an outwardly-facing horizontal cylindrical surface 140 extending rightwardly therefrom, and terminating in a rightwardmost circular vertical right end face 141. An annular slot, generally indicated at 142, extends radially into the valve portion body from surface 140. The respective horizontal holes in which rods 29,30 are slidably mounted, are shown as extending between the upper and lower chambers 14,15, and the right end face 141, so as to intersect intermediate slot 142. O-rings 143,144 seal the sliding joint between each actuator rod and the portions of the valve body on either side of slot 142. As shown in FIGS. 4a and 4b, the right marginal end portions of rods 29,30 extend horizontally beyond valve portion body right end face 141, and are suitably connected to the piston.

The actuator portion 138 is shown as broadly including a body 145 and a piston 146 slidably mounted thereon. The actuator body is shown as being a leftwardly-facing horizontally-elongated cup-shaped member, and as having integrally-formed internal and external axial post portions 148,148, respectively, extending leftwardly and rightwardly from the bottom of body 145. More particularly, the actuator body has an annular vertical left end face 150 suitably secured to the outer margin of valve body right end face 141, has a substantially circular vertical right end face 151, and has an outer surface which sequentially includes an outwardly-facing horizontal cylindrical surface 152 extending rightwardly from left end face 150, a rightwardly-facing annular vertical surface 153, and an outwardly-facing horizontal cylindrical surface 154 continuing rightwardly therefrom to join right end face 151. Diametrically-opposite portions of the rightwardly-extending external post portion 149 are shown as being appropriately bevelled to accommodate mounting of a pair of electrically-operated valves 155,156. The inner surface of the actuator body sequentially includes an inwardly-facing horizontal cylindrical surface 158 extending rightwardly from left end face 150, a leftwardly-facing annular vertical surface 159, an outwardly-facing horizontal cylindrical surface 160 extending leftwardly therefrom and terminating in a leftwardmost vertical circular surface 161. Surfaces 160,161 partially define the leftwardly-extending internal post portion 148, while surfaces 154,151 partially define the rightwardly-extending external post portion 149. A vertical hole 162 extends diametrically through the internal post portion. Hole 162 intersects with a horizontally-elongated chamber, generally indicated at 163, within the two post portions, which chamber terminates in a rightwardmost mixing chamber portion 164. Chamber portion 164 is arranged to receive fluid supplied by valves 155,156.

Piston 146 is operatively mounted within the actuator body for leftward and rightward horizontal sliding movement relative thereto. Specifically, the piston has a circular vertical left end face 165, an annular vertical right end face 166, and an outwardly-facing horizontal cylindrical surface 168 extending therebetween and slidably engaging body inner surface 158. A large diameter axial blind recess is shown as extending leftwardly into the piston from its right end face 166. Specifically, this recess is bounded by an inwardly-facing horizontal cylindrical surface 169 extending leftwardly from right end face 166, and a rightwardly-facing vertical circular surface 170. Piston recess surface 169 slidably engages internal post outer surface 160. Thus, the piston is operatively mounted on the actuator body for leftward and rightward horizontal sliding motion between valve portion body right end face 141 and actuator body portion surface 159. As previously indicated, the right marginal end portions of rods 29,30 are fixed or otherwise secured to the piston for movement therewith. The piston is further shown as being provided with two L-shaped passageways. A first of these passageways, generally indicated at 171, communicates piston recess surface 169 with piston right end face 166. The second of these passageways, generally indicated at 172, communicates piston recess surface 169 with piston left end face 172. These passageways are so configured and dimensioned, as shown in FIGS. 4a and 4b, that when the piston is in its extreme leftward position (as shown in FIG. 4a), passageway 172 communicates with internal post hole 162, while passageway 171 is separated from this hole. On the other hand, when piston 146 is in its extreme rightward position (as shown in FIG. 4b), passageway 171 communicates with internal post portion hole 162, while passageway 172 does not.

Conduit 173 supplies fluid fuel from a source thereof to valve portion inlet opening 16. Conduit 174 communicates conduit 173 with valve 155. Conversely, conduit 175 provides fluid oxidizer from a suitable source thereof to valve portion inlet opening 19. Conduit 176 communicates conduit 175 with valve 156. Each of electrically-operated valves 155,156 is normally-closed. However, these valves may be selectively operated so as to open simultaneously, and to admit minute quantities of fuel and oxidizer to mixing chamber portion 164.

When piston 146 is in its extreme leftward position such that piston left face 165 abuts valve portion right end face 141 (as shown in FIG. 4a), valve members 25,26 engage their respective seats 23,24 to prevent flow through the valve. If valves 155,156 are now opened to admit minute quantities of fuel and oxidizer to mixing chamber 154, such fluids will undergo a hypergolic reaction in chamber 163 and mixing chamber 164, and the products of this reaction will pass through piston passageway 172 to drive piston 146 rightwardly to the position shown in FIG. 4b. As this occurs, any fluid in piston right end chamber 178 is permitted to exhaust through a plurality of vent openings, severally indicated at 179. At the same time, other vent openings 180 are covered and blocked by the piston, until it passses by. When the actuator piston moves rightwardly from the position shown in FIG. 4a to the position shown in FIG. 4b, the valve members 25,26 will be moved rightwardly off their respective seats to permit flows of fuel and oxidizer through the valve, such as to hypergolic rocket engine.

When the piston is in its extreme rightward position such that piston right end face 166 abuts actuator body surface 159 (as shown in FIG. 4b), valves 155 and 156 may be momentarily opened to again admit minute quantities of fuel to chamber 163. However, when the piston is in this rightward position, piston passageway 172 is blocked, but piston passageway 171 communicates with internal post portion hole 162. Hence, such admitted quantities of fuel and oxidizer will undergo a hypergolic reaction, and the gaseous products thereof may pass through hole 162 and passageway 171 to drive the piston leftwardly from the position shown in FIG. 4b to the alternative position shown in FIG. 4a, thereby moving valve members 25,26 to engage their respective seats and preventing further flow through the valve. At the same time, any fluid in piston left end chamber 181 will be permitted to exhaust through vent openings 180. Thus, in this second embodiment, only two electrically-operated valves, namely valves 155,156 are used to operatively control the displacement of the actuator piston, and, concomitantly, the opening and closing of the valve.

As with the first three embodiments, this fourth embodiment may be readily modified so as to use the products of a disassociation reaction between a suitable mono-propellant fuel and a catalyst, rather than the products of a hypergolic reaction just described. To accomplish this alternative, a suitable catalyst bed, such as shown in phantom and indicated at 182 may be placed in mixing chamber 164. Valve 156 would then be unnecessary, and the electrically-operated fuel supply valve 155 could be selectively operated to admit such mono-propellant fuel to chamber 164, within which a disassociation reaction would occur, and the products thereof used to displace the piston.

Therefore, while four embodiments of the invention have been shown and described, and several modifications thereof have been shown and described, and several modifications thereof discussed, persons skilled in this art will readily appreciate that various additional changes and modifications may be made without departing from the spirit of the invention, as defined and differentiated by the following claims.

What is claimed is:

1. A valve assembly adapted to be associated with a source of mono-propellant fluid fuel, comprising:
   an enclosure having a first surface;
   a member mounted within said enclosure for movement toward and away from said first surface and forming a first chamber between said member and said first surface;
   a first catalyst arranged in said first chamber, said first catalyst being capable of reacting with fuel admitted to said first chamber for causing said fuel to disassociate;
   a first actuator valve communicating with said source and operatively arranged to selectively admit said fuel to said first chamber; and
   a main valve communicating with said source, said main valve having an element movable toward and away from a seat to control the flow of fluid through said main valve, said element being coupled to said member for movement therewith such that said member will move relative to said seat when said first actuator valve is operated;
   whereby, when said first actuator valve is opened, fuel will enter said first chamber and react with said first catalyst, and the products of such reaction will move said member away from said first surface and will move said element relative to said seat for controlling the flow of said fuel through said main valve.

2. A valve assembly as set forth in claim 1 wherein said enclosure is a cylinder, wherein said member is a piston, and wherein said first surface is one end surface of said cylinder.

3. A valve assembly as set forth in claim 2 wherein said cylinder has a seond end surface spaced from said first end surface, wherein a second chamber is formed between said piston and said second end surface, and wherein said piston is slidably mounted within said cylinder for movement between said end surfaces.

4. A valve assembly as set forth in claim 3 and further comprising a second catalyst arranged in said second chamber, said second catalyst being capable of reacting with fuel admitted to said second chamber for causing said fuel to disassociate, and a second actuator valve communicating with said fuel source and operatively arranged to selectively admit fuel to said second chamber;

whereby, when said second actuator valve is opened, fuel will enter said second chamber and react with said second catalyst, and the products of said reaction will move said piston away from said second end surface.

5. A valve assembly as set forth in claim 2 wherein said cylinder is provided with a first vent positioned such that, when said first actuator valve is operated, the products of such disassociation reaction in said first chamber will be confined to said first chamber until said piston reaches said first vent, and will be thereafter vented from said first chamber.

6. A valve assembly as set forth in claim 4 wherein said cylinder is provided with a second vent positioed such that, when said second actuator valve has been operated, the products of such disassociation reaction in said second chamber will be confined to said second chamber until said piston reaches said second vent, and will thereafter be vented from said second chamber.

7. A valve assembly as set forth in claim 1 wherein said element and member are coupled for linear movement with one another.

8. A valve assembly as set forth in claim 1 wherein said element and member are coupled for pivotal movement with one another.

9. A valve assembly as set forth in claim 8 and further comprising a cushion provided in said coupling.

10. A valve assembly adapted to be associated with a source of oxidizer and with a source of fuel, said oxidizer and fuel having a hypergolic reaction upon contact with one another, comprising:
an enclosure having a first surface;
a member mounted within said enclosure for movement toward and away from said first surface and forming a first chamber between said member and said first surface;
a first actuator valve communicating with said source of fuel and selectively operable to admit fuel to said first chamber;
a second actuator valve communicating with said source of oxidizer and selectively operable to admit oxidizer to said first chamber; and
a first main valve having an element movable toward and away from a seat to control a flow of fluid through said first main valve, said element being coupled to said member for movement therewith such that said member will move relative to said seat when said member moves relative to said first surface;
whereby, when said first and second actuator valves are operated to admit fuel and oxidizer to said first chamber, the resulting hypergolic reaction will cause said member to move away from said first surface and will cause said element to move in one direction relative to said seat for controlling the flow of fluid through said first main valve.

11. A valve assembly as set forth in claim 10 wherein said enclosure is a cylinder, wherein said member is a piston, and wherein said first surface is one end surface of said cylinder.

12. A valve assembly as set forth in claim 11 wherein said cylinder is provided with a first vent positioned such that, when said first and second actuator valves have been operated to admit fuel and oxidizer to said first chamber, the products of said hypergolic reaction will be confined to said first chamber until said piston reaches said first vent, and will be thereafter vented from said first chamber.

13. A valve assembly as set forth in claim 12 wherein said cylinder has a second end surface, and wherein said piston is mounted for movement between said first and second end surfaces, wherein a second chamber is formed between said piston and said second end surface, and further comprising a third actuator valve communicating with said source of oxidizer and selectively operable to admit oxidizer to said second chamber, and a fourth actuator valve communicating with said source of fuel and selectively operable to admit fuel to said second chamber;

whereby, when said third and fourth valves are operated to admit fuel and oxidizer to said second chamber, the resulting hypergolic reaction will cause said piston to move away from said second end surface.

14. A valve assembly as set forth in claim 13 wherein said cylinder is provided with a second vent positioned such that when said third and fourth actuator valves have been operated to admit fuel and oxidizer to said second chamber, the products of said hypergolic reaction will be confined to said second chamber until said piston reaches said second vent, and will be thereafter vented from said second chamber.

15. A valve assembly as set forth in claim 10 wherein said first main valve communicates with said fuel source, and further comprising a second main valve communicating with said oxidizer source, and wherein said member is arranged to control the operation of said second main valve.

16. A valve assembly as set forth in claim 10 and further comprising a cushion operatively arranged between said piston and said first main valve.

17. A valve assembly as set forth in claim 15 and further comprising a cushion operatively arranged between said piston and said second main valve.

18. A valve assembly as set forth in claim 10 wherein said first main valve is arranged to be operated in response to linear movement of said piston.

19. A valve assembly as set forth in claim 10 wherein said first main valve is arranged to be pivotally operated, and wherein said first main valve is operatively coupled to said piston.

* * * * *